United States Patent [19]

Ohya et al.

[11] Patent Number: 5,714,544
[45] Date of Patent: Feb. 3, 1998

[54] PROCESS FOR THE PRODUCTION OF PHENOLIC RESIN AND EPOXY RESIN COMPOSITION

[75] Inventors: Kazuyuki Ohya; Seiji Kita, both of Tokyo; Takaaki Fukai, Kurashiki; Michio Ohba, Tokyo, all of Japan

[73] Assignee: Mitsubishi Gas Chemical Company, Inc., Tokyo, Japan

[21] Appl. No.: 751,938

[22] Filed: Nov. 19, 1996

Related U.S. Application Data

[62] Division of Ser. No. 533,304, Sep. 25, 1995, abandoned, which is a continuation of Ser. No. 282,492, Aug. 1, 1994, abandoned.

[30] Foreign Application Priority Data

Aug. 5, 1993 [JP] Japan ............................ 5-194831
Mar. 4, 1994 [JP] Japan ............................ 6-034750

[51] Int. Cl.⁶ .................... C08L 61/10; C08L 63/04; C08L 61/06; C08L 61/14
[52] U.S. Cl. ................ 525/154; 525/156; 525/480; 525/481; 525/482; 525/491; 525/492
[58] Field of Search ..................... 525/154, 156, 525/480, 481, 482, 491, 492

[56] References Cited

U.S. PATENT DOCUMENTS

| | | | |
|---|---|---|---|
| 3,993,851 | 11/1976 | Robinson et al. | 428/531 |
| 4,110,279 | 8/1978 | Nelson et al. | 260/19 R |
| 4,529,790 | 7/1985 | Kamio et al. | 528/107 |
| 4,788,236 | 11/1988 | Kopf | 524/55 |
| 5,385,989 | 1/1995 | Ohya | 525/502 |

OTHER PUBLICATIONS

*Phenoplast*, T.S. Carswell, 1947, pp. 31 & 34.

Primary Examiner—W. Robinson H. Clark
Attorney, Agent, or Firm—Wenderoth, Lind & Ponack

[57] ABSTRACT

An aromatic hydrocarbon formaldehyde resin novolak, useful as a raw phenolic compound for producing a curing agent and an epoxy resin, an epoxy resin composition which contains a novolak type epoxy resin derived from the above novolak resin and an epoxy resin and is therefore excellent in heat resistance, adhesion and humidity resistance, and a process for the production of a phenolic resin, which comprises reacting an aromatic hydrocarbon formaldehyde resin, phenol and formaldehyde in a novolak-forming reaction in the presence of a catalyst to prepare an aromatic hydrocarbon formaldehyde resin novolak, and treating the reaction product with steam while maintaining the temperature of a reaction mixture at 120° to 195° C. to remove unreacted substances and to decompose high-molecular-weight polymers.

9 Claims, No Drawings

PROCESS FOR THE PRODUCTION OF PHENOLIC RESIN AND EPOXY RESIN COMPOSITION

This application is a continuation of now abandoned application Ser. No. 08/533,304, filed Sep. 25, 1995, which application is a continuation of now abandoned application Ser. No. 08/282,492, filed Aug. 1, 1994.

FIELD OF THE INVENTION

The present invention relates to a process for the production of a novel phenolic resin and a composition containing an epoxy resin derived from the phenolic resin. More specifically, it relates to a process for the production of a phenolic resin, and an epoxy resin composition which has excellent heat resistance and high adhesion properties, which is excellent in humidity resistance, resistance to cracking of a soldering and stress resistance, and which can be therefore suitably used as a material for a laminate, a semiconductor shielding agent, a molded article, a shell mold, an adhesive and a coating.

PRIOR ART OF THE INVENTION

Phenol-novolak resins composed mainly from phenols such as phenol and cresol have been hitherto used, while the defect with the phenol-novolak resins is that they contain a large amount of residual unreacted phenols.

For removing hydrophilic impurities such as phenols, there is known a method in which the reaction product is treated with steam, e.g., a steam distillation method. However, this treatment with steam cannot be applied to the production of a phenol-novolak resin, since the phenol-novolak is partially decomposed when treated with steam. Further, it is very difficult to decrease the phenol content to 1% or less.

For removing residual phenols from a phenol-novolak resin, therefore, it is generally required to employ a purification method using an organic solvent. However, this method requires an additional cost for the purification, and the resultant phenol-novolak resin is poor in moldability.

Therefore, a resin prepared from bisphenol instead of phenols is commercially available for using it in fields where it is particularly required to remove unreacted phenols.

As an epoxy compound, an epi-bis type epoxy compound prepared from bisphenol A and diglycidyl ether and an epoxy compound prepared from a novolak type epoxy compound prepared from cresol-novolak and diglycidyl ether are generally used.

Functional epoxy resins having about three functional groups or more are used for preparing a composite material used in an aircraft component material and a laminate, a coating material, a semiconductor shielding material and a molding material used in the field of electronics. Generally, novolak type epoxy resins are used in many cases. Typical examples of the novolak type epoxy resins include a phenol novolak type resin and a cresol novolak type resin. A novolak type epoxy resin has a high crosslinked density after being cured, since it is polyfunctional. As a result, a novolak type epoxy resin can be expected to exhibit high heat resistance and high chemical resistance, while it is hard and tends to be fragile. Further, a novolak type resin is poor in humidity resistance, particularly poor in adhesion to a metal, and the serious problem at present is that a novolak type resin is liable to undergo cracking of a soldering due to humidity.

A copper-clad laminate is generally produced from prepreg(s) prepared by impregnating reinforcing substrate(s) with a thermosetting resin. In particular, many copper-clad laminates formed of glass substrates impregnated with an epoxy resin and copper applied thereon (glass substrate-epoxy resin copper-clad laminates) are used in industrial electronic machines such as computers and controlling devices and non-industrial electronic machines such as video cameras and TV game machines.

However, with an increase in the density of printed circuits and with a progress in the degree of multi-layered structure, conventional glass substrate-epoxy resin copper-clad laminates are no longer satisfactory in view of required heat resistance and adhesion. It is hence desired to develop a copper-clad laminate excellent in heat resistance, adhesion and humidity resistance.

The above novolak-epoxy resin shows improvement in heat resistance which is the problem of a conventional epibis type epoxy resin. The problem with the novolak-epoxy resin is that, when used alone or incorporated in a large amount, the novolak-epoxy resin causes a decrease in anti-delamination strength, a decrease in the resistance to peeling of copper and a decrease in humidity resistance. These problems remain to be solved.

SUMMARY OF THE INVENTION

It is an object of the present invention to provide a novel aromatic hydrocarbon formaldehyde resin novolak, useful as a raw phenolic compound for producing a curing agent and an epoxy resin.

It is another object of the present invention to provide an epoxy resin composition which contains a novolak type epoxy resin prepared from the above novolak resin and an epoxy resin and is therefore excellent in heat resistance, adhesion and humidity resistance.

According to the present invention, there is provided a process for the production of a phenolic resin, which comprises reacting an aromatic hydrocarbon formaldehyde resin, phenol and formaldehyde in a novolak-forming reaction in the presence of a catalyst to prepare an aromatic hydrocarbon formaldehyde resin novolak, and treating the reaction product with steam while maintaining the temperature of a reaction mixture at 120° to 195° C. to remove unreacted substances and to decompose high-molecular-weight polymers.

According to the present invention, there is also provided an epoxy resin composition containing an aromatic hydrocarbon formaldehyde resin novolak type epoxy resin prepared by glycidyl-etherifying the above phenolic resin with epichlorohydrin, and an epoxy resin.

The aromatic hydrocarbon formaldehyde resin preferably has a number average molecular weight of 300 to 1,000, an oxygen content of 5 to 20% and a softening point of 40° to 140° C. Specific examples of the aromatic hydrocarbon formaldehyde resin include a mesitylene-formaldehyde resin, a xylene-formaldehyde resin, a toluene-formaldehyde resin and a naphthalene-formaldehyde resin. These aromatic hydrocarbon formaldehyde resins are used alone or in combination. The aromatic hydrocarbon formaldehyde resin and phenol are used in such amounts that the equivalent of reactive groups of the aromatic hydrocarbon formaldehyde resin is about the same as the equivalent of the phenol. The phenol/formaldehyde equivalent ratio is 1/0.77 to 1/0.65. The novolak resin is formed by reacting the aromatic hydrocarbon formaldehyde resin and phenol in the presence of an acid catalyst under heat at 120° to 180° C. for 1 to 8 hours, adding formaldehyde and a weak acid to the reaction mixture and allowing the resultant mixture to react at a temperature of 90° to 120° C. for 1 to 20 hours. The so-prepared reaction product is treated with steam at a temperature of 155° to 185° C. for 1 to 8 hours. The so-obtained phenolic resin has a number average molecular weight of 500 to 1,500, a molecular weight distribution (Mw/Mn) of 2 to 6 and a residual phenol content of 0.5% by weight or less. The weight average molecular weight of the phenolic resin is ½ to ⅕ of that of the hydrocarbon formaldehyde resin novolak which has not been treated with steam.

Further, the present invention provides an epoxy resin composition containing an aromatic hydrocarbon formaldehyde resin novolak type epoxy resin, prepared by glycidyl-etherifying the above-obtained phenolic resin with epichlorohydrin, and an epoxy resin. The aromatic hydrocarbon formaldehyde resin novolak type epoxy resin has a number average molecular weight of 1,500 or less and a monoglycidyl ether compound content of 1% by weight or less. In the epoxy resin composition of the present invention, the aromatic hydrocarbon formaldehyde resin novolak type epoxy resin/epoxy resin weight ratio is in the range of from 5/95 to 70/30.

DETAILED DESCRIPTION OF THE INVENTION

The present invention will be detailed hereinafter.

The present invention relates to a process for the production of a novel aromatic hydrocarbon formaldehyde resin novolak (novel phenolic resin). In particular, it relates to a process for the production of a phenolic resin which comprises treating the produced aromatic hydrocarbon formaldehyde resin novolak with steam under heat for the removal of unreacted substances and the decomposition of high-molecular-weight polymers.

The aromatic hydrocarbon formaldehyde resin used as a raw material is obtained from at least one of mesitylene, xylene, toluene, benzene, naphthalene, methylnaphthalene, dimethylnaphthalene and other aromatic hydrocarbons. Specific examples of the aromatic hydrocarbon formaldehyde resin include a mesitylene-formaldehyde resin, a xylene-formaldehyde resin, a toluene-formaldehyde resin, a benzene-formaldehyde resin and a naphthalene-formaldehyde resin.

The phenol used as a raw material includes phenol, cresol, xylenol and resorcinol.

The formaldehyde can be selected from formalin and those which generates formaldehyde under reaction conditions.

The novolak is preferably produced by a method in which the aromatic hydrocarbon formaldehyde resin and the phenol are allowed to react in the presence of an acidic catalyst at a temperature of 120° to 180° C. for 1 to 8 hours, the formaldehyde and at least one of an acidic catalyst and a neutral catalyst are added to the reaction mixture and the resultant mixture is allowed to react at 90° to 120° C. for 1 to 20 hours. The acidic catalyst is selected from inorganic acids such as sulfuric acid, hydrochloric acid and nitric acid, toluenesulfonic acid, xylenesulfonic acid and oxalic acid. The neutral catalyst is selected from calcium acetate, magnesium acetate, zinc oxide, other organic acid metal salt and zinc oxide. Further, it can be produced by a method in which the phenol and the formaldehyde are allowed to react, and then the aromatic hydrocarbon formaldehyde resin is reacted with the reaction product or a method in which the aromatic hydrocarbon formaldehyde resin, the phenol and the formaldehyde are allowed to react at the same time.

The aromatic hydrocarbon formaldehyde resin and the phenol are preferably used in such amounts that the equivalent of reactive groups of the aromatic hydrocarbon formaldehyde resin is about the same as the equivalent of the phenol. Examples of the reactive groups include oxygen-containing groups such as $-CH_2OH$, $-CH_2OCH_2-$, $-CH_2O$ and $-CH_2OCH_2OH$. When the amount of the phenol is too small, disadvantageously, part of the reaction product undergoes gelation, the viscosity increases, and unreacted substances remain due to the discontinuation of the reaction. When the phenol amount is too large, the plasticity decreases to decrease the adhesion capability.

The formaldehyde is used in such an amount that a novolak-forming reaction takes place. The phenol/formaldehyde equivalent ratio is 1/1 to 1/0.6.

For example, when a xylene formaldehyde resin having a number average molecular weight of 350 to 800 and an oxygen content of 8 to 17% by weight and the phenol are allowed to react, the xylene formaldehyde resin/phenol weight ratio is 100/100 to 100/250, preferably 100/100 to 100/200.

The aromatic hydrocarbon formaldehyde resin novolak obtained by the above method is generally a brown solid having a softening point of 60° to 120° C. and containing several percent of residual phenol. When measured for a molecular weight by gel permeation chromatography (GPC), the aromatic hydrocarbon formaldehyde resin shows a number average molecular weight of 1,000 to 1,500 and a weight average molecular weight of approximately 20,000 to 50,000. In some cases, it also shows a shoulder-like peak similar to that of a compound having a higher molecular weight.

In the present invention, the formaldehyde/phenol weight ratio is preferably approximately 0.77 - 0.65, since the molecular weight distribution after the steam treatment can be greatly decreased.

In the present invention, steam is blown over the reaction mixture after the above novolak-forming reaction finishes, whereby unreacted phenol is removed and a formed high-molecular-weight novolak component is decomposed. This treatment not only removes monomers which cause a decrease in heat resistance and deteriorate a working environment, but also decomposes a large amount of portions composed only of phenol-novolak bond which are assumed to be present in a high-molecular-weight substances, whereby there is obtained a novel novolak type phenolic resin which is free from the deterioration of moldability.

In blowing steam over the reaction mixture while the reaction mixture is stirred, the temperature of the reaction mixture is set at 120° to 195° C., preferably 155° to 185° C., the final amount (weight) of steam is 1 to 20 times, preferably 2 to 5 times, as large as the amount (weight) of the reaction mixture, and the introduction of steam by blowing is carried out for 0.5 to 24 hours, preferably 2 to 6 hours. Further, the steam, unreacted phenol and the like are removed from the reaction mixture. The introduction may be carried out when the temperature of the reaction mixture is higher than 195° C. Undesirably, however, methylol bond portions are substantially decomposed as well in this case. When the temperature of the reaction mixture is lower than the above lower limit, undesirably, it takes a long time to complete the above treatment, and the high-molecular-weight substances are insufficiently decomposed.

Owing to the above treatment, there is obtained a novel phenolic resin having a number average molecular weight of 500 to 1,500, a molecular weight distribution of 2 to 6, a residual phenol content of 0.5% or less and a weight average molecular weight which is ½ to ⅕ of that of the aromatic hydrocarbon formaldehyde resin novolak which has not been treated with steam.

The novel phenolic resin obtained by the above process of the present invention has advantages over conventional phenol novolak resins or conventional aromatic hydrocarbon formaldehyde resin novolak.

First, conventional phenolic resins generally easily turn reddish brown when allowed to stand in air, while the phenolic resin provided by the present invention is a bluish light-yellow transparent solid or a yellowish opaque solid, and its color does not change when allowed to stand in air.

Second, the residual phenol content is very small, and the moldability is not impaired, as is expected from the molecular weight distribution thereof.

Third, the phenolic resin provided by the present invention has excellent water resistance over conventional phenolic resins.

Therefore, the novel phenolic resin provided by the present invention can be used in fields where the use of conventional phenolic resins are limited due to their properties (water resistance, heat resistance and electric properties) and appearance (coloring).

For example, when used as a curing agent for an epoxy resin, the phenolic resin provided by the present invention is excellent in adhesion and hue (color tone) and free from impairment of the heat resistance, and it has higher water resistance and shows lower water absorption percentage. Therefore, the epoxy resin is excellent in electric properties even after it absorbs water.

The present invention also relates to an epoxy resin composition containing an epoxy resin and an aromatic hydrocarbon formaldehyde resin novolak type epoxy resin prepared from the above phenolic resin.

The above novolak type epoxy resin is prepared by a method in which the above phenolic resin (aromatic hydrocarbon formaldehyde resin novolak) is glycidyl-etherified by reacting —OH group of the phenolic resin with epichlorohydrin.

The above reaction can be carried out by a known method, and the obtained novolak type epoxy resin generally has a softening point of 45° C. or higher. For the epoxy resin composition of the present invention, it is preferred to use a novolak type epoxy resin having a number average molecular weight of 400 to 2,000, preferably 1,500 or less, particularly preferably 800 to 1,300 and a monoglycidyl ether compound content of 3% by weight or less, more preferably 1% by weight or less, particularly preferably 0.5% by weight or less.

When the above number average molecular weight exceeds 2,000, the fluidity of the epoxy resin composition decreases, and the moldability thereof is poor. When it is less than 400, the epoxy resin composition shows insufficient improvement in impact resistance, adhesion and humidity resistance. Further, when the content of a monoglycidyl ether compound is large, the working environment is degraded and the epoxy resin composition shows poor heat resistance.

The epoxy resin used in the composition of the present invention in addition to the above novolak type epoxy resin is selected, without any limitation, from those generally used in laminates, shielding agents, adhesives and coating compositions. Examples of the above epoxy resin used in combination include glycidyl ether types such as bisphenol A type epoxy resins and phenol novolak type epoxy resins, glycidyl ester types, glycidylamine types, linear aliphatic epoxides and alicyclic epoxides, and halogenated epoxy resins of these. Of these epoxy resins, preferred are epoxy resins having at least two epoxy groups in the molecule.

As a curing promoter or a catalyst for the epoxy resin composition of the present invention, there is used any one of imidazoles, imidazolines and amines which are generally used with an epoxy resin. Typical examples of these include 2-ethyl-4-methylimidazole and 2,4,6-tris(diaminomethyl) phenol (called DMP-30 for short).

As a curing agent for the epoxy resin composition of the present used for shielding, a novolak type epoxy resin is generally used.

For use of the epoxy resin composition of the present invention for producing laminates, dicyandiamide is used in combination with the above catalysts in many cases.

As a curing agent for the epoxy resin composition of the present invention used for casting or filament winding, an acid anhydride such as phthalic anhydride is generally used.

As a curing agent for the epoxy resin composition of the present invention used as an adhesive or an anti-corrosion coating composition, there is generally used an aromatic amine such as m-xylylenediamine, etc., aliphatic amine and a polyamine, which are used for curing at a low temperature.

When the thermosetting epoxy resin composition of the present invention is used for producing laminates, predetermined substrates are impregnated with the resin composition, or the resin composition is applied to predetermined substrates, then the substrates are dried to prepare B-stage prepregs, a plurality of the prepregs are stacked, a copper foil is optionally laminated thereon, and the laminate is heated under pressure.

As the above substrate, a glass fiber fabric is generally used, while the substrate can be also selected from aromatic polyamide fibers, aromatic polyester fibers and aromatic polyesterimide fibers. Further, it can be also selected from mat-shaped glass, mat-shaped polyester, mat-shaped aromatic polyamide, mat-shaped polyester fibers and mat-shaped aromatic polyesterimide fibers.

The above impregnation or application is generally carried out at a temperature between room temperature and 60° C., and the composition is dried at 100° to 180° C. for 3 to 20 minutes to obtain B-stage prepreg.

The heating under pressure is generally carried out at a temperature of 120° to 230° C. under pressure of 5 to 150 kg/cm$^2$ for 30 to 240 minutes.

When the epoxy resin composition of the present invention is used for shielding, it may generally contain an inorganic filler such as silica, a mold-releasing agent such as carnauba wax, a coupling agent such as epoxysilane and a flame retardant such as antimony oxide or a halogen compound as required. The epoxy resin composition and the above inorganic filler, etc., are kneaded under heat with a twin-screw kneader, a hot roll or a Henschel mixer and milled to prepare a powder as required, the powder is optionally formed into tablets, and the powder or the tablets is/are primarily cured with a mold at 20 to 100 kg/cm$^2$ at 150° to 200° C. by compression molding or transfer molding. Then, the primarily cured product is post-cured at 180° to 230° C. for 2 to 12 hours.

The thermosetting epoxy resin composition of the present invention is excellent in heat resistance, adhesion and humidity resistance, and has plasticity and stress-relaxation properties while it is hot. Further, it is excellent in electric performance, particularly high frequency characteristics. It can be therefore suitably used as an adhesive and a heat-resistant coating.

The present invention will be further detailed hereinafter with reference to Examples, in which "part" stands for "part by weight" and "%" stands for "% by weight".

EXAMPLE 1

100 Parts of a xyleneformaldehyde resin ("Nikanol G", supplied by Mitsubishi Gas Chemical Co., Inc., number average molecular weight 520–620% oxygen content 14–16%) and 150 parts of phenol were reacted with each other in the presence of 0.1 part of p-toluenesulfonic acid as a catalyst at 120° C. for 2 hours.

Then, 1.5 parts of oxalic acid and 35 parts of 37% formalin as formaldehyde were added, and the mixture was allowed to react at 100° C. for 3 hours.

Thereafter, 1.5 parts of slaked lime was added, and while the mixture was heated, it was subjected to dehydration treatment under reduced pressure. When the temperature reached 155° C., the dehydration under reduced pressure was terminated. In this case, the distillate amount was about 5% on the basis of the charged amount (phenol).

This xyleneformaldehyde resin-modified novolak.phenolic resin (to be referred to as "Resin NC1" hereinafter) was a brown transparent solid and had a softening point (a ring ball method, JIS K-7234) of 89° C. and a phenol content of 4.2%, and it was measured for molecular weights by GPC using polystyrene as standard to show Mn=910, Mw=4,500 and Mw/Mn=4.9.

After the dehydration was completed, while the reaction liquid was stirred and maintained at 160° C., steam at 4 ata(G) was blown over the reaction liquid surface until no phenol was substantially detected in the distillate gas by gas chromatography.

Then, dehydration under reduced pressure was initiated, and when the temperature reached 155° C. at 10 torr, the dehydration under reduced pressure was terminated to give a xyleneformaldehyde resin-modified novolak-phenolic resin (to be referred to as "Resin N1" hereinafter).

Resin N1 was a bluish light-yellow transparent solid, and had a softening point of 104° C. and a phenol content of 0.38%, and it was measured for molecular weights by GPC using polystyrene as standard to show Mn=1,040, Mw=2,200 and Mw/Mn=2.2.

When the phenol in the resin was omitted from yield calculation, there was no difference between the yield before the steam treatment and the yield after the steam treatment.

Further, when the blowing of steam was carried out for 3 hours, the resultant resin had a softening point of 105° C. and a phenol content of 0.04%, and it was measured for molecular weights by GPC using polystyrene as standard to show Mn=1,050, Mw=2,180 and Mw/Mn=2.1.

100 Parts of Resin N1 and 14 parts of solid sodium hydroxide were dissolved in 130 parts of water, and the solution was heated up to 50° C. with vigorous stirring. 32 Parts of epichlorohydrin was added with stirring, and the mixture was allowed to react at 80° C. with homogeneous stirring. After the reaction, excess epichlorohydrin was removed under reduced pressure, benzene was added to wash the reaction product, and water was removed. Pure water was added to wash the reaction product, and water was removed. This procedure of adding pure water and removing water was repeated to purify the reaction product. Then, benzene was distilled off under reduced pressure to give a xyleneformaldehyde resin-modified novolak.epoxy resin (to be referred to as "Resin E1" hereinafter) having a softening point of 83° C., a number average molecular weight of 1,220 and an epoxy equivalent of 270.

30 Parts of Resin E1 was incorporated into 70 parts of a brominated epoxy compound (Product No.; FX132, supplied by Toto Kaseisha, epoxy equivalent 485). Further, 3.1 parts of diacyandiamide (called DICY for short) as a curing agent, 0.08 part of 2-ethyl-4-methylimidazole (called 2E4MZ for short) as a catalyst, 32 parts of methyl ethyl ketone as a solvent and 8 parts of dimethylformamide were added to prepare a resin composition. Glass fabrics (#7628-SV657, 0.2 mm thick) were impregnated with the resin composition, and the composition was dried in a drier at 150° C. for 15 minutes to give prepregs.

Four prepregs were stacked, a 18 μm thick foil having roughened surfaces was stacked on one surface of the stacked prepregs, and a 35 μm thick copper foil having roughened surfaces was stacked on the other surface. This pile was subjected to laminated molding at a pressure of 80 kg/cm$^2$ at a temperature of 170° C. for 90 minutes to give a 0.8 mm thick double-sided copper-clad laminate. The so-obtained laminate was tested according to JIS S C-6481, K-6911. Table 1 shows the results.

COMPARATIVE EXAMPLE 1

35 Parts of 37% formalin as formaldehyde and 1.5 parts of oxalic acid were added to 100 parts of phenol, and the mixture was allowed to react at 100° C. for 3 hours. Then, 1.5 parts of slaked lime was added, and the mixture was subjected to dehydration treatment under reduced pressure with heating. When the temperature reached 105° C., the dehydration under reduced pressure was terminated. In this case, the amount of phenol in the distillate was about 5% based on the charged phenol amount.

This novolak.phenolic resin was a brown solid and had a softening point of 101° C. and a phenol content of 6.8%, and it was measured for molecular weights by GPC using polystyrene as standard to show Mn=600, Mw=4,200 and Mw/Mn=7.

After the dehydration treatment, the blowing of steam was carried out for 3 hours in the same manner as in Example 1 until no phenol was detected.

Then, the dehydration treatment under reduced pressure was initiated, and when the temperature of the reaction liquid became 105° C. at 10 torr, the dehydration under reduced pressure was terminated to give a novolak.phenolic resin.

The above-obtained novolak.phenolic resin was a brown solid, and had a softening point of 105° C. and a phenol content of 1.7%, and it was measured for molecular weights by GPC using polystyrene as standard to show Mn=650, Mw=3,800 and Mw/Mn=6. Further, the yield was lower than the yield before the steam treatment by about 15%.

COMPARATIVE EXAMPLE 2

A double-sided copper-clad laminate was obtained in the same manner as in Example 1 except that Resin E1 was replaced with a bisphenol A type epoxy resin (Epikote #1001, supplied by Yuka-Shell Epoxy K.K.).

Table 1 shows the results.

COMPARATIVE EXAMPLE 3

A double-sided copper-clad laminate was obtained in the same manner as in Example 1 except that Resin E1 was replaced with a cresol novolak type epoxy resin (#ESCN 220F, supplied by Sumitomo Chemical Co., Ltd.).

Table 1 shows the results.

EXAMPLE 2

100 Parts of a xyleneformaldehyde resin ("Nikanol H", supplied by Mitsubishi Gas Chemical Co., Inc., number average molecular weight 460–500, oxygen content 10–11%) and 100 parts of phenol were reacted with each other in the presence of 0.1 part of p-toluenesulfonic acid as a catalyst at 130° C. for 2 hours.

Then, 1 part of zinc oxide and 35 parts of 37% formalin as formaldehyde were added, and the mixture was allowed to react at 100° C. for 3 hours. Thereafter, while the mixture was heated, it was subjected to dehydration treatment under reduced pressure. When the temperature reached 150° C., the dehydration under reduced pressure was terminated. In this case, the distillate amount was about 6%.

The above-obtained xyleneformaldehyde resin-modified novolak.phenolic resin was a brown opaque solid, and had a softening point of 105° C. and a phenol content of 4.8%, and it was measured for molecular weights by GPC using polystyrene as standard to show Mn=1,270, Mw=42,000 and Mw/Mn=33.

After the dehydration was completed, the reaction liquid was maintained at 155° C., and this temperature was maintained for 2 hours while high-temperature steam was introduced.

Then, the introduction of steam was terminated, and the dehydration treatment under reduced pressure was initiated. When the temperature reached 150° C. at 15 torr, the dehydration under reduced pressure was terminated to give a xyleneformaldehyde resin-modified novolak.phenolic resin (to be referred to as Resin N2 hereinafter).

The above Resin N2 was a light-yellow opaque solid and had a softening point of 114° C. and a phenol content of 0.47%, and it was measured for molecular weights by GPC using polystyrene as standard to show Mn=1,310, Mw=7,800 and Mw/Mn=5.9.

Further, when the blowing of steam was carried out for 3 hours, the resultant resin had a softening point of 115° C. and a phenol content of 0.07%, and it was measured for molecular weights by GPC using polystyrene as standard to show Mn=1,320, Mw=7,750 and Mw/Mn=5.9.

100 Parts of Resin N2 and 13 parts of solid sodium hydroxide were dissolved in 130 parts of water, and the solution was heated up to 50° C. with vigorous stirring. 32 Parts of epichlorohydrin was added with stirring, and the mixture was allowed to react at 80° C. with homogeneous stirring. After the reaction, excess epichlorohydrin was removed under reduced pressure, benzene was added to wash the reaction product, and water was removed. Pure water was added to wash the reaction product, and water was removed. This procedure of adding pure water and removing water was repeated to purify the reaction product. Then, benzene was distilled off under reduced pressure to give a xyleneformaldehyde resin-modified novolak.epoxy resin (to be referred to as "Resin E2" hereinafter) having a softening point of 86° C., a number average molecular weight of 1,150 and an epoxy equivalent of 265.

A double-sided copper-clad laminate was obtained in the same manner as in Example 1 except that the Resin E1 was replaced with Resin E2.

TABLE 1

| | Ex. 1 | CEx. 2 | CEx. 3 | Ex. 2 |
|---|---|---|---|---|
| Glass transition temperature (DMA method) (°C.) | 170 | 150 | 172 | 168 |
| Copper foil peel strength | | | | |
| 35 μm (kg/cm) | 1.93 | 2.00 | 1.78 | 2.10 |
| 18 μm (kg/cm) | 1.41 | 1.50 | 1.36 | 1.62 |
| Delamination strength (kg/cm) | 0.91 | 1.30 | 0.66 | 1.23 |
| Volume resistivity (20° C., ×10$^{15}$ Ω cm) | 8.0 | 7.0 | 3.0 | 8.0 |
| Resistance to methylene chloride, *1 Weight increase percentage (%) | | | | |
| After 5 minutes | 0.74 | 1.61 | 0.53 | 0.82 |
| After 30 minutes | 1.85 | 2.20 | 1.89 | 1.88 |
| Appearance | | | | |
| After 5 minutes | A | A | A | A |
| After 30 minutes | A | B | A | A |
| Resistance to water absorption and heat *2 | | | | |
| After 0 hour | | | | |
| Absorbed water amount % | 0.82 | 0.88 | 0.88 | 0.81 |
| Appearance after floating in solder | A | B | A | A |
| After 4 hours | | | | |
| Absorbed water amount % | 1.06 | 1.10 | 1.13 | 1.02 |
| Appearance after floating in solder | C | C | C | B |
| After 5 hours | | | | |
| Absorbed water amount % | 1.14 | 1.18 | 1.26 | 1.08 |
| Appearance after floating in solder | C | C | C | C |
| Flame retardancy (UL 94) | 94-VO | 94-VO | 94-VO | 94-VO |

Ex. = Example, CEx. = Comparative Example
*1: A sample was immersed in methylene chloride for a predetermined period of time and measured for a weight, and the appearance was visually observed. A: No change, B: Surface was lightly roughened.
*2: A test piece prepared by removing copper foils from both sides of a laminate by etching was treated with saturated steam for a predetermined period of time, and floated in a solder bath at 260° C. for 20 seconds. A: No change, B: Slightly swollen, C: Swollen.

EXAMPLE 3

100 Parts of a naphthaleneformaldehyde resin and 100 parts of phenol were reacted with each other in the presence of 0.1 part of p-toluenesulfonic acid as a catalyst at 140° C. for 2 hours. Then, 1 part of oxalic acid and 35 parts of 37% formalin were added, and the mixture was allowed to react at 100° C. for 2.5 hours. Thereafter, while the mixture was heated, it was subjected to dehydration treatment under reduced pressure. When the temperature reached 165° C., the dehydration under reduced pressure was terminated to give a brown opaque naphthalene.formaldehyde resin-modified novolak.phenolic resin having a softening point of 125° C. In this case, the amount of phenol in the distillate was about 4% based on the charged phenol amount.

After the dehydration was completed, the reaction liquid was maintained at 170° C., and the reaction liquid was treated with high-temperature steam.

Then, the dehydration treatment under reduced pressure was initiated. When the temperature reached 165° C. at 40 torr, the dehydration under reduced pressure was terminated to give a naphthalene.formaldehyde resin-modified novolak.phenolic resin (to be referred to as Resin N3 hereinafter).

The above Resin N3 was a yellow opaque solid and had a softening point of 114° C. and a phenol content of 0.42 and it was measured for molecular weights by GPC using polystyrene as standard to show Mn=1,380, Mw=5,934 and Mw/Mn=4.30.

A naphthalene.formaldehyde resin-modified novolak.epoxy resin having a softening point of 114° C. and an epoxy equivalent of 292WPE (to be referred to as "Resin E3" hereinafter) was obtained in the same manner as in Example 1 except that Resin N1 was replaced with Resin N3.

60 Parts of Resin E3 was incorporated into 40 parts of a brominated phenol novolak resin type epoxy resin (BREN, supplied by Nippon Kayaku, epoxy equivalent 285). Further, 40 parts of bisphenol A novolak (LF 7911, supplied by Dainippon Ink & Chemicals, Inc.) as a curing agent, 1 part of 2,4,6-tris(diaminomethyl)phenol (called DMP-30 for short) as a cure promoter and 2 part of carnauba wax as a mold releasing agent were incorporated, and the mixture was milled and blended to obtain a binder.

Separately, 1 part of γ-glycidoxypropyl-trimethoxysilane (A-181, supplied by Nippon Unicar) as a coupling agent, 1 part of carbon black as a colorant, 5 parts of an antimony trioxide powder as a flame retardant aid and 350 parts of synthetic silica as a filler were mixed with a Henschel mixer to obtain a filler.

The above binder (20 parts) and the above filler (80 parts) were kneaded with rolls at 70° to 80° C. for 10 minutes, preliminarily milled and formed into tablets to give an intended resin composition for semiconductor shielding.

The above-obtained composition was transfer-molded in a mold of which the top mold member had a fitted aluminum foil at 180° C. for 2 minutes at a pressure of 70 kg/cm$^2$. The resin composition was tested for workability in molding, and the so-obtained cured resin test piece was tested for heat resistance, humidity resistance and occurrence of crack in resistance to a hot-cool cycle. Table 2 shows the results.

EXAMPLE 4

60 Parts of Resin E1, 40 parts of a curing agent (LF 7911), 1 part of a cure promoter (DMP-30) and 2 parts of a mold releasing agent (carnauba wax) were incorporated into 60 parts of the same brominated phenol novolak resin as that used in Example 3, and the mixture was milled and blended to obtain a binder.

The above binder (20 parts) and the same filler (80 parts) as that prepared in Example 3 were kneaded with rolls at 70° to 80° C. for 10 minutes, preliminarily milled and formed into tablets to give an intended resin composition for semiconductor shielding.

The above-obtained composition was transfer-molded in a mold of which the top mold member had a fitted aluminum foil at 180° C. for 2 minutes at a pressure of 70 kg/cm$^2$. The resin composition was tested for workability in molding, and the so-obtained cured resin test piece was tested for heat resistance, humidity resistance and occurrence of crack in resistance to a hot-cool cycle. Table 2 shows the results.

EXAMPLE 5

43 Parts of the same Resin N1 obtained in Example 1, 40 parts of the same brominated phenol novolak type epoxy resin as that used in Example 3, 35 parts of a cresol novolak type epoxy resin (#ESCN 220F, supplied by Sumitomo Chemical Co., Ltd., epoxy equivalent ***), 1 part of a cure promoter (DMP-30) and 2 parts of a mold releasing agent (carnauba wax) were mixed, and the mixture was milled and blended to obtain a binder.

The above binder (20 parts) and the same filler (80 parts) as that prepared in Example 3 were kneaded with rolls at 70° to 80° C. for 10 minutes, preliminarily milled and formed into tablets to give an intended resin composition for semiconductor shielding.

The above-obtained composition was transfer-molded in a mold of which the top mold member had a fitted aluminum foil at 180° C. for 2 minutes at a pressure of 70 kg/cm$^2$. The resin composition was tested for workability in molding, and the so-obtained cured resin test piece was tested for heat resistance, humidity resistance and occurrence of crack in resistance to a hot-cool cycle. Table 2 shows the results.

COMPARATIVE EXAMPLE 4

40 Parts of the same brominated phenol novolak type epoxy resin as that used in example 3, 60 parts of a cresol novolak type epoxy resin (ESCN 195XL, supplied by Sumitomo Chemical Co., Ltd., epoxy equivalent 195), 50 parts of bisphenol A novolak as a curing agent, 1 part of a cure promoter (DMP-30) and 2 parts of a mold releasing agent (carnauba wax) were mixed, and the mixture was milled and blended to obtain a binder.

The above binder (20 parts) and the same filler (80 parts) as that prepared in Example 3 were kneaded with rolls at 70° to 80° C. for 10 minutes, preliminarily milled and formed into tablets to give an intended resin composition for semiconductor shielding.

The above-obtained composition was transfer-molded in a mold of which the top mold member had a fitted aluminum foil at 180° C. for 2 minutes at a pressure of 70 kg/cm$^2$. The resin composition was tested for workability in molding, and the so-obtained cured resin test piece was tested for heat resistance, humidity resistance and occurrence of crack in resistance to a hot-cool cycle. Table 2 shows the results.

TABLE 2

| | Ex. 3 | Ex. 4 | Ex. 5 | CEx. 4 |
|---|---|---|---|---|
| Glass transition temperature (DMA method) (°C.) | 173 | 167 | 168 | 165 |
| 20 μm thick Aluminum foil peel strength (kg/cm) | 0.53 | 0.62 | 0.46 | 0.41 |
| Flexural strength (kgf/mm$^2$) | 15.8 | 14.5 | 14.9 | 13.2 |
| Flexural modulus (kgf/mm$^2$) | 1,450 | 1,310 | 1,530 | 1,630 |
| Volume resistivity (20° C., ×10$^{15}$ Ω cm) | | | | |
| Resistance to water absorption and heat *3 | | | | |
| After 10 hours | | | | |
| Absorbed water amount % | 0.27 | 0.29 | 0.31 | 0.39 |
| Appearance after floating in solder | A | A | A | A |
| After 20 hours | | | | |
| Absorbed water amount % | 0.29 | 0.32 | 0.34 | 0.43 |
| Appearance after floating in solder | A | A | A | B |
| Flame retardancy | 94-VO | 94-VO | 94-VO | 94-VO |

TABLE 2-continued

|  | Ex. 3 | Ex. 4 | Ex. 5 | CEx. 4 |
|---|---|---|---|---|
| (UL 94) |  |  |  |  |

Ex. = Example, CEx. = Comparative Example
*3: A test piece prepared by removing aluminum foils from both sides of a laminate was treated with saturated steam for a predetermined period of time, and floated in a solder bath at 260° C. for 20 seconds. A: No change, B: Slightly swollen, C: Swollen

EXAMPLE 6–8 AND COMPARATIVE EXAMPLE 5

Resins NC1, N1, N2 and N3 and hexamethyleneteraamine (to be referred to as "HMTM" hereinafter) were respectively milled to prepare "200-mesh-through" powders.

100 Parts of the above-prepared powder NC1, N1, N2, or N3, 400 parts of glass fiber chopped strands surface-treated with a silane coupling agent and 100 parts of fluorinated mica (trade name; MK-100, supplied by Cope Chemical Co., Ltd.) surface-treated with a titanium stearate coupling agent (Titacoat S151, supplied by Nippon Soda Co., Ltd.) were charged into a Henschel mixer, and mixed for 10 minutes. Then, 10 parts of HMTM was added to the above mixture and mixed for 10 minutes to prepare a molding material.

The above-obtained molding material was placed in a mold, molded at 65° C. at 200 kg/cm$^2$ for 5 minutes and at 160° C. at 200 kg/cm$^2$ for 10 minutes, and post-cured in an oven at 200° C. for 4 hours.

The so-obtained molded articles were measured for physical properties. Table 3 shows the results.

Table 3 clearly shows that the molded article produced from the novel phenolic resin of the present invention is excellent in hue and electric properties and also excellent over the conventional molded article in strength and moldability.

TABLE 3

|  | Ex. 6 | CEx. 5 | Ex. 7 | Ex. 8 |
|---|---|---|---|---|
| Resin | N1 | NC1 | N2 | N3 |
| Appearance |  |  |  |  |
| Hue | yellow | brown | yellowish | yellow |
| Surface state | good | fine cracking | good | good |
| Burr | small | ordinary | small | small |
| Flexural strength (kgf/mm$^2$) | 19 | 13 | 18 | 20 |
| Flexural modulus (kgf/mm$^2$) | 1,150 | 1,400 | 1,100 | 1,450 |
| Dielectric coefficient*4 (1 MHz) ε | 4.3 | 5.2 | 4.2 | 4.0 |
| Dielectric loss tangent*4 (1 MHz) tan δ | 0.008 | 0.030 | 0.0076 | 0.009 |

Ex. = Example, CEx. = Comparative Example
*4: Measured after molded articles were allowed to stand at room temperature for 48 hours.

EXAMPLE 9

99 Parts of Resin N1 obtained in Example 1 and 1 part of γ-glycidoxypropyltrimethoxysilane were mixed to prepare a binder composition.

3 Parts of the above binder composition was mixed with 100 parts of quartz sand (free mantle sand) having a temperature of 150° C., and 3 parts of an aqueous solution containing 10% of hexamine was added. The mixture was stirred with cooling for 5 minutes, and further, 0.15 part of calcium stearate was added.

The above-obtained mixture was molded/cured into a cylindrical test piece having a diameter of 50 mm and a height of 50 mm at 280° C. for 3 minutes. This test piece showed a compression strength of 9.8 kgf/mm$^2$ after 0.5 hour, 20.0 kgf/mm$^2$ after 1 hour and 40.3 kgf/mm$^2$ after 24 hours.

EXAMPLE 10

60 Parts of Resin N1, 40 parts of a brominated phenol novolak type epoxy resin (trade name; BREN, epoxy equivalent 285, supplied by Nippon Kayaku), 35 parts of a cresol novolak type epoxy resin (trade name; #ESCN 220F, epoxy equivalent 215, supplied by Sumitomo Chemical Co., Ltd.), 1 part of 2,4,6-tris(diaminomethyl)phenol as a cure promoter and 2 parts of carnauba wax as a mold release agent were mixed, and the mixture was milled to prepare a binder.

1 Part of γ-glycidoxypropyltrimethoxysilane (trade name; A-187, supplied by Nippon Unicar) as a coupling agent, 1 part of carbon black as a colorant, 5 parts of an antimony trioxide powder as a flame retardant aid and 350 parts of a synthetic silica powder as an additive were mixed with a Henschel mixer to prepare a filler.

20 Parts of the above binder and 80 parts of the above filler were roll-kneaded at 70° to 80° C. for 10 minutes, preliminarily milled, and tablet-formed to prepare a molding material of a resin composition for sealing semiconductors.

The above molding material was transfer-molded with a mold of which the upper mold member had an aluminum foil attached, at 180° C. for 2 minutes at 70 kg/cm$^2$ to prepare test pieces of the thermosetting resin. In this case, the thermosetting resin composition was tested for workability in molding, and the so-obtained test pieces were tested for heat resistance, humidity resistance and occurrence of crack in resistance to a hot-cool cycle. Table 4 shows the results.

TABLE 4

|  | Example 10 |
|---|---|
| Glass transition temperature (DMA method) °C. | 168 |
| Peel strength of 20 μm thick aluminum foil kg/cm | 0.46 |
| Flexural strength kgf/mm$^2$ | 14.9 |
| Flexural modulus kgf/mm$^2$ | 1,530 |
| Volume resistivity (20° C.) ×10$^{15}$ Ω cm) | 1.0 |
| Resistance to water absorption and heat |  |
| After 10 hour |  |
| Absorbed water amount % | 0.31 |
| Appearance after floating in solder*5 | A |
| After 20 hours |  |
| Absorbed water amount % | 0.34 |
| Appearance after floating in solder*5 | A |
| Flame retardancy (UL 94) | 94-VO |

*5: A test piece prepared by removing aluminum foil was treated with saturated steam for a predetermined period of time (10 hours or 20 hours), and floated in a solder bath at 260° C. for 20 seconds. A: No change, B: Slightly swollen, C: Swollen As is clear from the above examples, the aromatic hydrocarbon-formaldehyde resin-modified novolak of the present invention such as xylene.formaldehyde resin-modified novolak has a light color, and the amount of toxic impurities such as phenol contained therein is very small. Further, the content of high-molecular-weight substances is greatly decreased. The aromatic hydrocarbon-formaldehyde resin-modified novolak of the present invention is excellent in heat resistance and water resistance and safe, and it is also free from deterioration in moldability. The epoxy resin composition of the present invention, which contains, as an essential component, the epoxy resin prepared by epoxidizing the above novolak of the present invention, has excellent heat resistance and shows low water absorption properties, resistance to cracking of a soldering and excellent adhesion. The epoxy resin composition of the present invention can give copper-clad laminates, semiconductor shielding materials, adhesives, coating materials, molding materials and shell molding materials, all of which have well-balanced physical properties.

What is claimed is:

1. A process for the production of a phenolic resin, which comprises reacting an aromatic hydrocarbon formaldehyde resin, phenol and formaldehyde in a novolak-forming reaction in the presence of a catalyst to form a reaction mixture thereof, dehydrating the reaction mixture under heat and under reduced pressure to prepare an aromatic hydrocarbon formaldehyde resin novolak, blowing steam over the reaction mixture for 1 to 8 hours while maintaining the temperature of the reaction mixture at a temperature between 155° C. and 185° C. to remove unreacted substances and to decompose high-molecular-weight polymers.

2. A process according to claim 1, wherein the aromatic hydrocarbon formaldehyde resin has a number average molecular weight of 300 to 1,000, an oxygen content of 5 to 20% and a softening point of 40° to 140° C.

3. A process according to claim 2, wherein the aromatic hydrocarbon formaldehyde resin is at least one member selected from the group consisting of a mesitylene-formaldehyde resin, a xylene-formaldehyde resin, a toluene-formaldehyde resin and a naphthalene-formaldehyde resin.

4. A process according to claim 1, wherein the aromatic hydrocarbon formaldehyde resin and the phenol are used in such amounts that the equivalent of reactive groups of the aromatic hydrocarbon formaldehyde resin is about the same as the equivalent of the phenol and the phenol/formaldehyde equivalent ratio is 1/0.77 to 1/0.65.

5. A process according to claim 1, wherein the novolak-forming reaction is carried out by reacting the aromatic hydrocarbon formaldehyde resin with the phenol in the presence of an acid catalyst at a temperature between 120° C. and 180° C. for 1 to 8 hours, then adding formaldehyde and weakly acidic or neutral catalyst to the reaction mixture and allowing the resultant mixture to react at a temperature between 90° C. and 120° C. for 1 to 20 hours.

6. A process according to claim 1, wherein the phenolic resin has a number average molecular weight of 500 to 1,500, a molecular weight distribution of 2 to 6, a residual phenol content of 0.5% or less and a weight average molecular weight which is 1/2 to 1/5 of the aromatic hydrocarbon formaldehyde resin.novolak obtained by the novolak forming reaction but not treated with steam.

7. An epoxy resin composition containing an aromatic hydrocarbon formaldehyde resin novolak type epoxy resin prepared by glycidyl-etherifying the phenolic resin recited in claim 1 with epichlorohydrin, and another epoxy resin.

8. An epoxy resin composition according to claim 7, wherein the aromatic hydrocarbon formaldehyde resin novolak type epoxy resin has a number average molecular weight of 1,500 or less and a monoglycidyl ether compound content of 1% by weight or less.

9. An epoxy resin composition according to claim 7, wherein the aromatic hydrocarbon formaldehyde resin novolak type epoxy resin and the another epoxy resin are contained in an aromatic hydrocarbon formaldehyde resin novolak type epoxy resin/another epoxy resin weight ratio of 5/95 to 70/30.

* * * * *

UNITED STATES PATENT AND TRADEMARK OFFICE
CERTIFICATE OF CORRECTION

PATENT NO. : 5,714,544
DATED : February 3, 1998
INVENTOR(S) : Kazuyuki Ohya, et. al.

It is certified that error appears in the above-identified patent and that said Letters Patent is hereby corrected as shown below:

Title page, item [62] change "Division" to --Continuation--.

Column 16, line 22, change "buLnot" to --but not--.

Signed and Sealed this

Ninth Day of February, 1999

Attest:

Attesting Officer

*Acting Commissioner of Patents and Trademarks*